June 7, 1960  W. J. BROWN  2,940,054
STABILIZED PHASE MODULATORS
Filed March 30, 1956  5 Sheets-Sheet 1

INVENTOR.
WALTER J BROWN
BY James B. Grant
ATTORNEY

June 7, 1960 W. J. BROWN 2,940,054
STABILIZED PHASE MODULATORS
Filed March 30, 1956 5 Sheets-Sheet 2

*INVENTOR.*
WALTER J BROWN
BY
*James B. Grant*
ATTORNEY

June 7, 1960  W. J. BROWN  2,940,054
STABILIZED PHASE MODULATORS
Filed March 30, 1956  5 Sheets-Sheet 3

INVENTOR.
WALTER J BROWN
BY
James B. Grant
ATTORNEY

June 7, 1960   W. J. BROWN   2,940,054
STABILIZED PHASE MODULATORS
Filed March 30, 1956   5 Sheets-Sheet 4

*INVENTOR.*
WALTER J BROWN
BY
James B. Grant
*ATTORNEY*

June 7, 1960 W. J. BROWN 2,940,054
STABILIZED PHASE MODULATORS
Filed March 30, 1956 5 Sheets-Sheet 5

INVENTOR.
WALTER J BROWN
BY
James B. Grant
ATTORNEY

United States Patent Office 2,940,054
Patented June 7, 1960

2,940,054

STABILIZED PHASE MODULATORS

Walter J. Brown, 71 Gurley Road, Stamford, Conn.

Filed Mar. 30, 1956, Ser. No. 575,133

6 Claims. (Cl. 332—29)

This invention pertains in general to phase modulator systems employing a sensitive phase shifting network, for instance of the general type described in my U.S. patents Serial Numbers 2,524,759, 2,524,760, 2,524,761, 2,524,- 762, and more particularly to such systems which include a saturable reactor, the saturating winding of which supplies the modulating current.

An object of my invention is to provide a phase modulator system incorporating drift stabilization in the modulating and modulated circuits.

Another object of my invention is to provide a phase modulator system requiring no vacuum tubes.

Another object of my invention is to provide drift stabilization in a phase modulator by utilization of direct current reference voltages derived from voltages across impedances in the phase shifting network.

Another object of my invention is to provide a phase modulator system using a carbon microphone in which a direct current voltage derived from the carrier is used as the source of voltage for the microphone circuit.

Another object of my invention is to provide a phase modulator including a phase shifting network having connected impedances in which a saturable reactor is employed to provide variable inductance as one of such impedances.

Another object of my invention is to provide a phase modulating system including a phase shifting network having connected impedances in which one such impedance is a reactance tube with variable inductive or capacitive characteristics.

Another object of my invention is to provide a phase modulation system including a phase shifting network with a saturable reactor in which the saturating winding is supplied by modulating current from a carbon microphone circuit from which the usual D.C. component has been filtered out and in which a constant D.C. polarizing current is supplied to said saturating winding, or in which a constant polarizing magnetization is applied to the saturable reactor core by means of a permanent magnet.

Another object of my invention is to provide a phase modulator the output of which is symmetrical with regard to positive and negative variations in the amplitude of the microphone current.

Another object of my invention is to provide a phase modulator in which the mean phase angle of the output is not appreciably affected by drift in the carrier input frequency. Other objects and a fuller understanding of my invention may be had by referring to the following description and claims taken in conjunction with the accompanying drawings in which:

Figure 7:
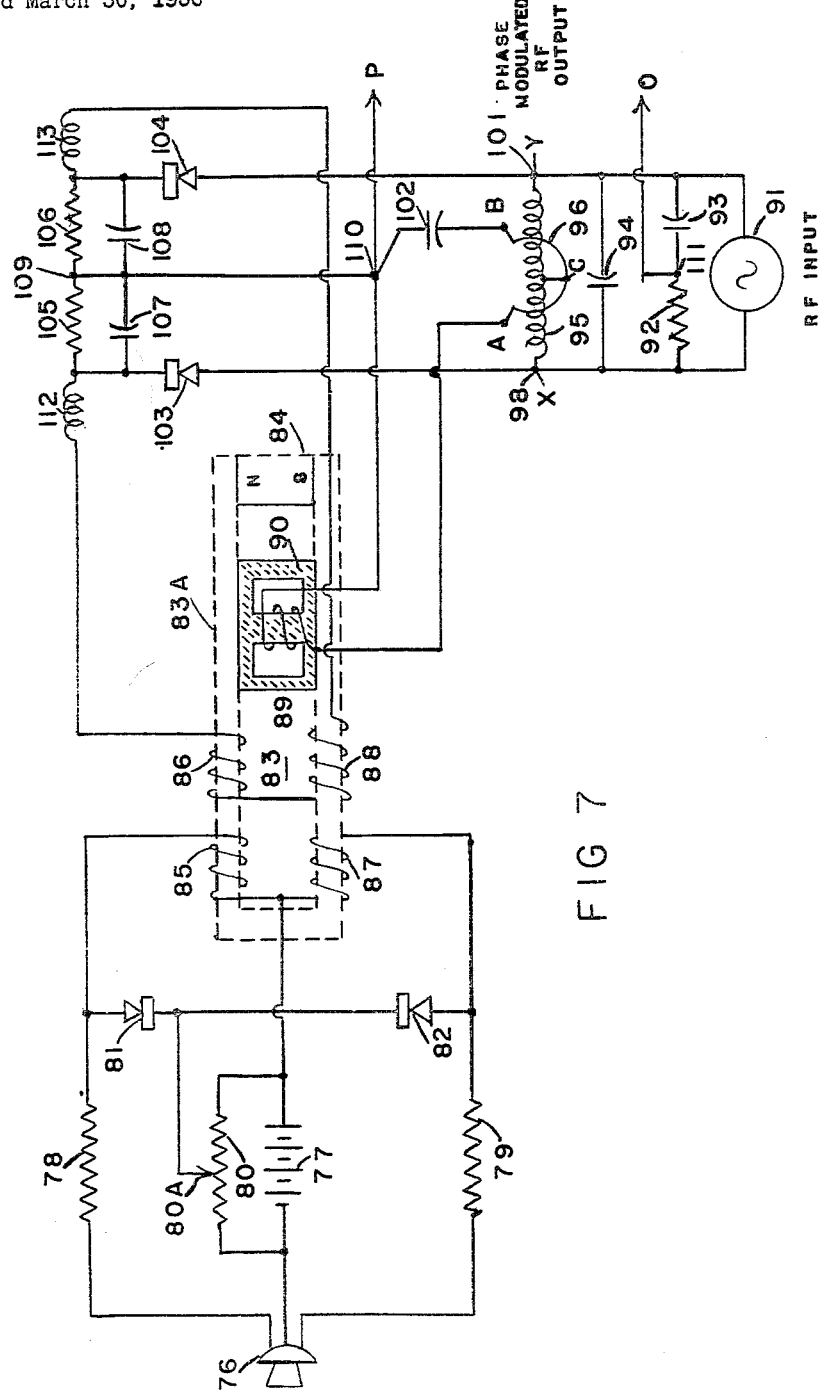

Figure 7 illllustrates a complete phase modulator embodying the inventions.

Figure 8:
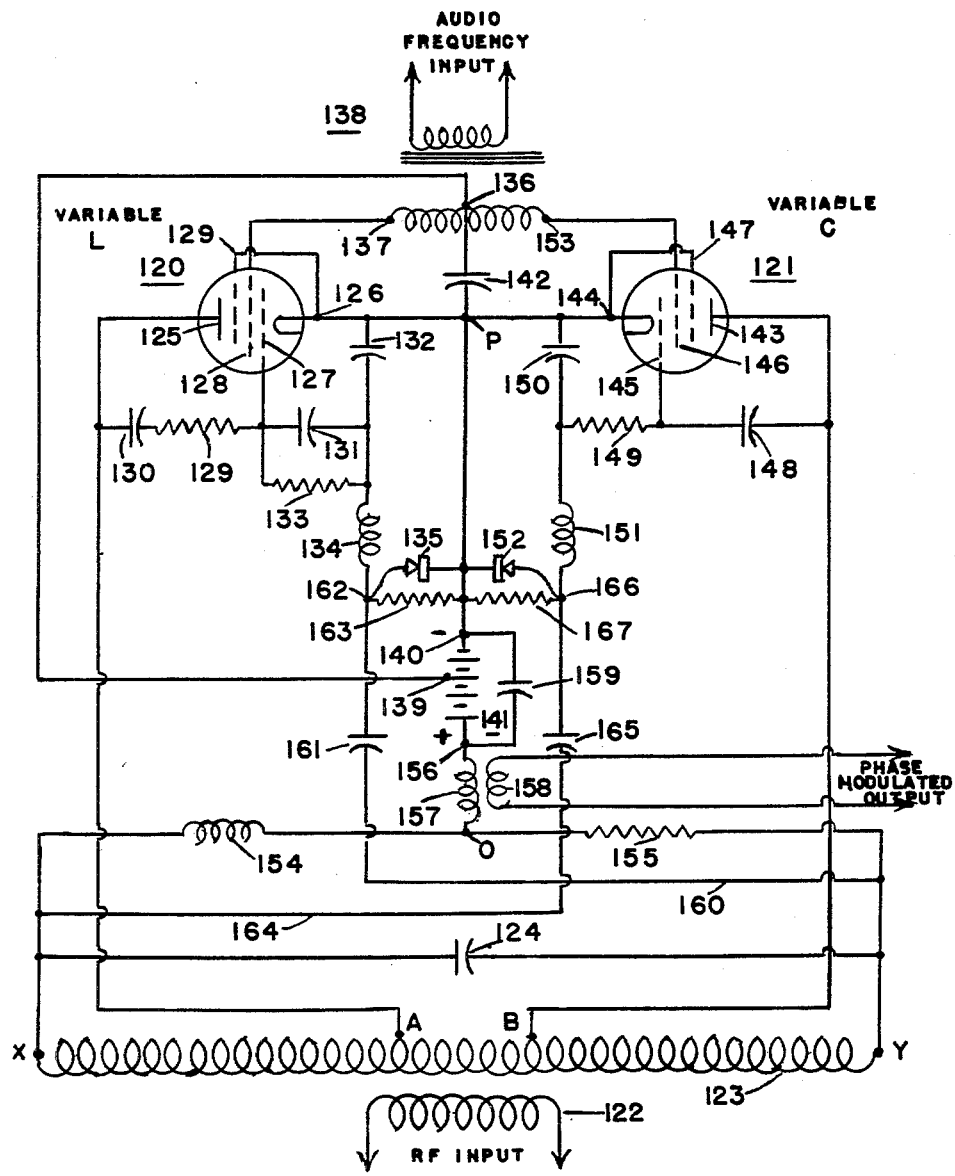

Figure 8 illustrates an alternative phase modulator employing reactance tubes.

Figure 1:
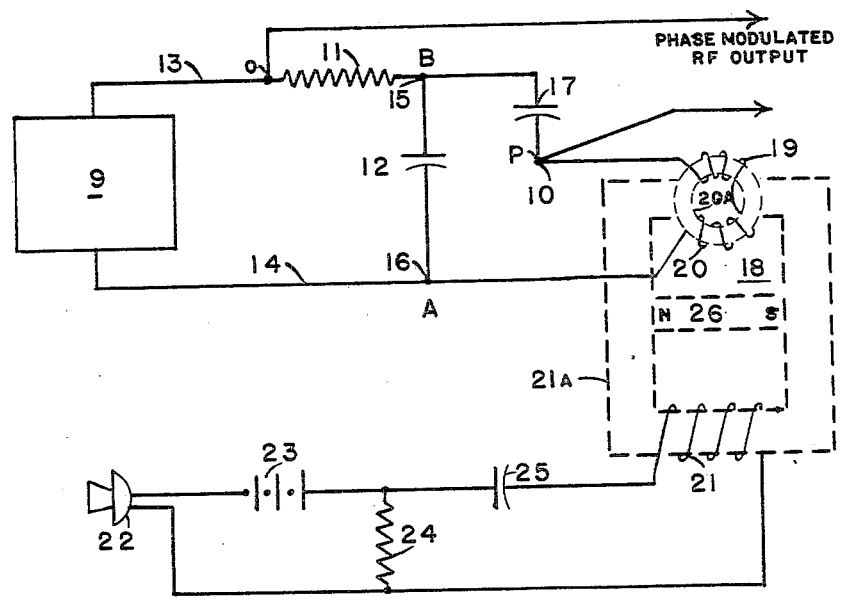
Figure 1 is a circuit diagram of a phase modulator.

My invention embodies various phase modulator networks for obtaining wide angle phase shift without appreciable distortion, without serious drift and usually without employing vacuum tubes. Figure 1 is a basic circuit in which RF oscillator 9, having constant frequency and phase, is connected thru conductors 13 and 14 to a phase shifting network consisting of terminal 0, resistor 11, terminal 15, capacitor 12, terminal 16, capacitor 17, terminal 10, and saturable reactor 18. This phase shifting network is similar to that shown in Fiure 1 and, in operation, in Figure 3 of my U.S. patent serial Number 2,524,759 described in detail in the specification of that patent. The saturable reactor 18 consists of two radio frequency windings 19 and 20 wound on a radio frequency magnetic core portion 20A and an audio saturating winding 21 wound on an audio frequency magnetic core portion 21A. The radio frequency core portion comprises a toroid of ferrite or powdered magnetic material, while the audio frequency core portion comprises a laminated iron structure. Winding 21 is driven by an audio modulating circuit consisting of a carbon microphone 22 connected thru battery 23, resistor 24, and capacitor 25 to winding 21; capacitor 25 is employed to block the D.C. microphone current and to supply to the saturating winding 21 the A.C. component of the microphone current alone. The permanent magnet 26 supplies a constant polarizing magnetization to the magnetic core portions. The output of the phase modulator is taken from terminals 0 and 10 across the phase shifting network.

Figure 2:
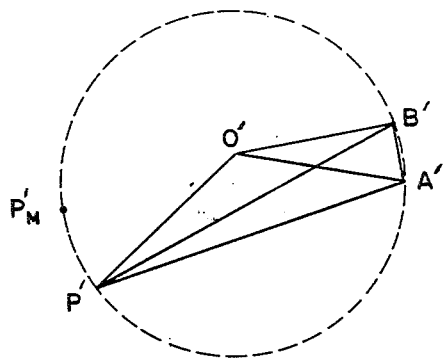
Figure 2 is a vector diagram showing the vector relationship of designated voltages of Figure 1.

Figure 2 is a vector diagram showing the relationships of base line voltage A'B' taken across terminals 16 and 15 to the input voltage O'A' which represents the voltage across R.F. oscillator 9 which has constant phase and frequency. P'A' is the voltage across the inductive elements 19 and 20 between terminals 10 and 16 and P'B' is the voltage across the capacitive element 17 between the terminals 10 and 15. When the signal current through the saturating winding 21 is increased in such a direction as to assist the magnetization of core portion 20A by the permanent magnet 26, the inductance of the windings 19 and 20 is decreased, thus resulting in a reduction of the voltage P'A' in relation to the voltage P'B'; if the saturable reactor is designed so that its Q or phase angle remains approximately constant while its inductance is varied by saturation, the angle A'P'B' will remain constant while the ratio of the amplitudes P'A' and P'B' is varied and accordingly the point P' will move counter clockwise around the arc of a circle spanning the baseline A'B' as shown by the dotted line. When the signal current through the saturating winding 21 is reversed so as to oppose the magnetization of core portion 20A by the permanent magnet, the point P' will move clockwise around the dotted circular arc. By suitable design the point O' may be located near to the center of said arcuate locus and the output voltage O'P' may then be varied in phase in accordance with the microphone current while remaining substantially constant in amplitude. The phase relationship of O'P' under the quiescent condition, when no signal is applied to the winding 21, is determined by the magnetization produced by the permanent magnet 24 and the position of said magnet is preferably adjustable so that this may be set at a median value such as O'P'$_M$.

Figure 3:
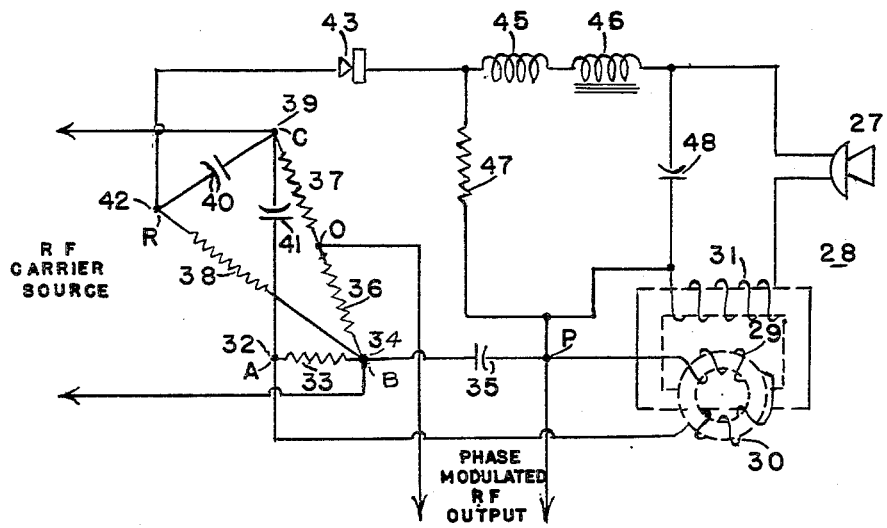
Figure 3 is a circuit diagram of a phase modulator including current stabilizing means.

Figure 3 is another arrangement of a phase modulator circuit comprising the phase shifting network including a saturable reactor, the audio modulation circuit including a microphone, terminals for connection to a radio frequency carrier source voltage and output terminals. One difficulty with such arrangements is that the average microphone current may vary and in turn vary the mean angle of phase shift so that the modulation may become unsymmetrical. In the arrangement of Figure 3 the microphone is supplied with a D.C. current which is obtained by rectifying an A.C. current at carrier frequency, which A.C. current is obtained from the phase shifter in such a way as to regulate itself to a suitable value. The phase shifter has input terminals 34, 39, for connection to a radio frequency carrier source which is not shown; resistor 36, output terminal 0, resistor 37 are connected across said input terminals; resistor 33 and capacitor 41 are also serially connected across said input terminals; saturable reactor 28 has radio frequency windings 29 and 30 directly connected in the phase shifter circuit thru output terminal P and condenser 35, across the resistor 33. A fixed phase-shifting network comprising resistor 38 and capacitor 40 is also connected across input terminals 34, 39, through terminal 42. Microphone 27 is energized with a direct current derived by rectifying the high frequency voltage appearing across terminals P and 42 thru rectifier 43 and resistor 47 and the filter consisting of radio frequency choke 45 and low frequency choke 46 and capacitor 48. The microphone is also connected directly thru audio winding 31 of the saturable reactor to terminal P.

Figure 4:
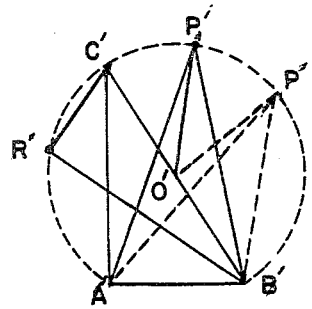
Figure 4 is a vector diagram showing the vector relationship of designated voltages in Figure 3.

Operation of the circuit of Figure 3 will be understood by reference to the vector diagram Figure 4 in which C'B' is the radio frequency carrier input voltage across terminals 39 and 34; A'P'₁ is the voltage across terminals 32 and P; B'P'₁ is the voltage across terminals 34 and P; C'R' is the voltage across terminals 39 and 42; and B'R' is the voltage across terminals 34 and 42. The voltages P'A' and P'B' are generally as described with reference to Figure 2. An A.-C. voltage of carrier frequency is supplied to C'B' and this energizes the network and establishes the baseline voltage A'B' and also establishes the potential of points O' and R'. As generally described with relation to Figure 2, the position of the output potential point P' is dependent upon the ratio between A'P' and P'B', and this can be varied by varying the current in the saturating winding 31 of the saturable reactor 28, so as to cause the potential P' at the output terminal P to move round the arcuate locus shown in dotted lines. In the arrangement of Figure 3, however, the second output terminal O' is located at the center-point of the resistors 36 and 37 which are connected across the input carrier terminals 34 and 39; accordingly, when the inductance of the saturable reactor windings 29 and 30 is varied by altering the microphone current which flows thru the saturating winding 31, the output voltage O'P' is varied in phase while remaining substantially constant in amplitude. The microphone is energized by a direct current derived by rectifying and filtering the voltage R'P'. Accordingly as the phase of O'P' advances, R'P' decreases, thus decreasing the energization of the microphone and decreasing the saturation of the reactor which tends to retard the phase of O'P'. The low frequency choke 46 and condenser 48 are provided with a time constant which is longer than that of the signals to be transmitted, so as to permit the slow automatic correction of the mean position of P'. In this way P' will take up a mean position such as P'₁ while also permitting rapid excursions of P' on either side of P'₁ in accordance with the modulation frequencies which results in symmetrical phase modulation.

Figure 5:
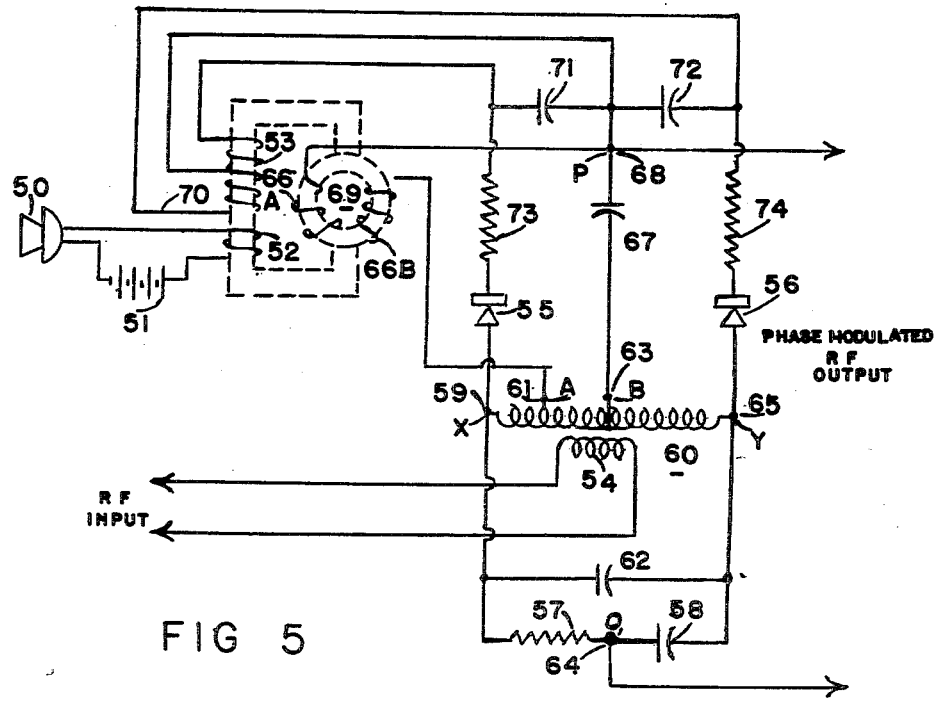
Figure 5 is another phase modulator circuit including stabilization means.

Figure 5 is another arrangement showing a complete tubeless phase modulation system. When a carbon microphone is used as the audio frequency source it is expected that there will be a drift in the mean phase shift due to changes in the D.C. exciting current; also there will be a drift in the mean phase shift if the frequency of the R.F. input should change; the arrangement of Figure 5 shows a method of minimizing said drifts. In accordance with this improvement two D.C. voltages are derived by rectifying two high frequency voltages which are strongly dependent on the output phase angle of the modulator. The two D.C. voltages produce a resultant D.C. magneto-motive force in the saturating core of the saturable reactor which corrects the mean output phase angle. For understanding of the arrangement reference may be had to the drawing in which the audio frequency source is a carbon microphone 50 connected with a battery source of D.C. voltage 51 to the audio winding 52 of a saturable reactor 69. The radio-frequency windings 66A and 66B of the saturable reactor are connected in series with condenser 67, thru output terminal 68 and are supplied with radio frequency voltage from tappings 61 and 63 on the inductor 60. The inductor 60 has its end terminals 59 and 65 connected across the condenser 62 to form an oscillatory "tank" circuit which is energized by mutual induction from a coupling coil 54 which is connected to a radio frequency oscillator which is not shown but is indicated by the words "R.F. Input." A resistor 57 and condenser 58 are also connected across the inductor 60, thru a second output terminal 64.

Figure 6:
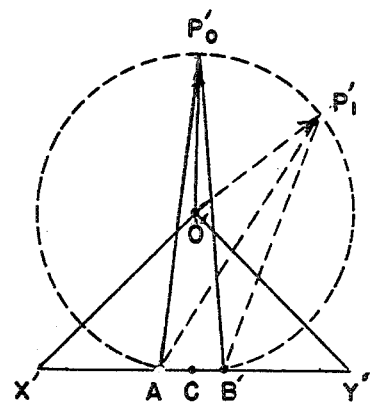
Figure 6 is a vector diagram showing the vector relationship of designated voltages in Figure 5.

Referring to Figure 6 which is a voltage vector diagram the potentials at terminals 59 and 65 are represented by the letters X' and Y'. The potential at output terminal 68 is represented by the letter P' and the potential at output terminal 64 is represented by the letter O'. The circuit is adjusted so that under normal quiescent conditions, the radio frequency impedance of the saturable reactor windings 66A and 66B is controlled by the steady microphone current so as to be equal to the radio frequency impedance of condenser 67 and accordingly the voltage A'P' is equal to the voltage P'B', as shown in Figure 6 at A'P'₀, P'₀B'. When the microphone current is modulated by sound, the impedance of windings 66A and 66B will be varied alternately above and below its quiescent value, and the point P' will be moved alternately clockwise and counterclockwise around the dotted arcuate locus, from its quiescent position P'₀, and the output voltage O'P' will accordingly be phase modulated in a symmetrical manner about its quiescent position O'P'₀.

If, however, the quiescent value of the microphone current should change, or if the R.F. input frequency should change, the saturable reactor core will be saturated less or more than is desired, so that the quiescent value of its impedance will be higher or lower than the impedance of condenser 67; accordingly the output vector O'P' will not occupy the desired symmetrical position O'P₀', but will occupy some unsymmetrical position such as is shown in dotted lines at O'P₀'. A correcting circuit is accordingly provided, consisting of an additional saturating winding 53 on the saturable reactor, which is energized by the difference between two D.C. voltages which are proportional to the R.F. voltages X'P' and Y'P' respectively. For this purpose, rectifiers 55 and 56, which may be of the selenium, germanium or silicon type, are connected from each end of the tank circuit inductor 60, to each end respectively of the correcting winding 53 on the saturable reactor, and the terminal 68 is connnected to a center tap 70 on said winding 53. Condensers 71 and 72 are connected across the output of rectifiers 55 and 56, to store up the rectified power, and resistors 73 and 74 are provided to limit the power taken from the tank circuit and also to introduce into the correcting circuit a time constant which is comparable with the lowest audio frequency it is desired to transmit. Any slow change in the microphone current or in the R.F. input frequency will produce a difference in the voltages X'P' and Y'P' and, after rectification by rectifiers 55 and 56 a corresponding difference is applied to the high resistance correcting winding 53 of the saturable reactor and accordingly magnetizes it in one direction or the other, dependent on whether X'P' is greater or less than Y'P', thus altering the saturable reactor impedance in such a way as to correct the position of P' by bringing it back towards $P_0'$. On the other hand, any signal arising from the microphone circuit which is higher in frequency, resulting from voice modulation, causes point P' to move back and forth along the dotted circular arc, regardless of the temporary differences between the voltages X'P' and Y'P', since the time constant of the rectifier circuits is too long to provide an appreciable correcting signal.

Figure 7 shows in more detail a complete phase modulator which is generally similar in operation to Figures 5 and 6.

Double button carbon microphone 76 is connected thru resistors 78 and 79 to the control windings 85 and 87 of saturable reactor 83. Rectifiers 81 and 82 are connnected back to back and biassed through a tap 80A on resistor 80 connected across battery 77 which may be any source of D.C. voltage. Rectifiers 81 and 82 provide a clipper effect limiting the maximum frequency deviation. Voltage across the inductive windings 85 and 87 is proportional to the modulating frequency so that rectifiers 81 and 82 conduct and limit the peal voltage to a value determined by the biassing or reference voltage from resistor 80 which corresponds to a definite frequency deviation. The resistors 78 and 79 ensure that the current in the control windings is independent of the modulating frequency. The saturable reactor 83 may have a laminated core structure 83A as shown in the dotted lines, carrying the control windings for the audio frequency path, and may have a pot core 90 of powdered iron or ferrite, as shown in cross-section in Figure 7, carrying the winding 89 in the radio frequency path. The polarity is such that the audio frequency control windings 85 and 87 assist each other in driving an audio frequency flux from end to end of the pot core 90; on the other hand, the radio frequency current in winding 89 produces a radio frequency flux which circulates between the central core and the outer shell of the "pot" without traversing the laminated section of the core. The permanent magnet 84 is arranged in shunt with the magnetic audio circuit including the pot core; and is magnetized in the direction shown by the symbols NS. The double button carbon microphone 76 produces a roughly equal and opposite D.C. magnetization with respect to the laminated core structure of the saturable reactor through windings 85 and 87. A radio frequency carrier source voltage 91 is supplied to a resonant "tank" circuit comprising inductance 95 and condenser 94.

The radio frequency saturable reactor winding 89 is connected in series with condenser 102, through the output terminal 110, across a coupling coil 96, shown as a single turn coil surrounding the inductance 95. The coupling coil 96 has end terminals A, B, and a center tap C which is connected to the center point of the inductance 95. Accordingly, the voltage across points A and B is generally equivalent to the voltage between tappings A and B on the inductance 60 of Figure 5, and may be approximately so represented on the vector diagram of Figure 6; the voltages across the inductance 89 and the condenser 102 may therefore be represented by the vector triangle A'P'B', and the point P may be moved around its arcuate locus by varying the inductance of the winding 89.

Resistor 92 and condenser 93 are connected in series, through a second output terminal 111, between points 98 and 101, across the inductance 95, and their voltages may be represented by the vector triangle X'O'Y' in Figure 6. Accordingly, an output voltage O'P' may be taken from the phase modulator which can vary in phase over a wide angle while remaining substantially constant in amplitude.

In order to correct the position of point P' so that it assumes a symmetrical position close to $P_0'$ under quiescent conditions, rectifiers 103, 104 are provided in conjunction with condensers 107, 108 and resistors 105, 106, for the purpose of developing D.C. voltages across condensers 107, 108 which are generally proportional to the A.C. voltages X'P' and Y'P' in the vector diagram of Figure 6. These D.C. voltages are applied to opposite ends of the saturable reactor "correcting" windings 86 and 88 with such polarity that any difference between said D.C. voltages moves the point P' towards its symmetrical position $P_0'$.

Radio frequency chokes 112 and 113 are provided to minimize high frequency losses, and furthermore the condensers 107, 108 and resistors 105, 106 and the windings 86, 88 are so chosen as to provide a relatively long time constant in comparison with the period of the lowest frequency modulating signal which it is desired to transmit. Accordingly, the correcting circuits operate to prevent or minimize the slow drift of the output phase angle O'P' from its symmetrical or median position $O'P_0'$ but they do not operate quickly enough to prevent the rapid modulation of phase angle to either side of $O'P_0'$ at the desired audio or other signalling frequencies. Figure 8 is another arrangement of a phase modulator in which two vacuum tubes 120 and 121 are so connnected as reactance tubes, that their plate circuits are equivalent to a variable inductance and to a variable capacitance respectively, so that the A.C. components of their plate voltages may be represented by the vectors A'P' and B'P' respectively, in the vector diagram of Figure 6.

In Figure 8, a radio frequency input to coil 122 is coupled into a coil 123 which has end terminals X, Y, and tapping points A, B. A tuning condenser 124 is connected across X and Y so as to form a resonant tank circuit. Tapping point A is connected to plate 125 of pentode tube 120, which also has a cathode 126, a grid 127, a screen grid 128 and a suppressor grid 129 which is connected to cathode 126. The grid 127 is connected to anode 125 through a high resistance 129 and a relatively large isolating condenser 130, and the grid 127 is also connected to cathode 126 through a small condenser 131 and a relatively large isolating condenser 132. Negative bias is supplied to grid 127 through a high resistance 133 and R.F. choke 134 from a rectifier 135 in a manner to be explained later. The resistor 129 and condenser 131 are so proportioned that when a radio frequency A.C. voltage is applied between anode 125 and cathode 126, an A.C. voltage is applied between grid 127 and cathode 126 which lags the applied anode voltage by nearly 90°, so that the anode current lags the anode voltage by nearly 90° and the anode cathode circuit has the properties of an inductance. The reactance of this inductive circuit is varied by applying the audio frequency modulating signal from terminals 136, 137 of transformer 138 to the screen grid 128, in series with a D.C. screen voltage derived from terminals 139, 140 of a D.C. source which is shown as a battery 141 having its negative terminal 140 connected to cathode 126; a bypass condenser 142 is connected from cathode 126 to transformer tap 136. Accordingly the vacuum tube 120 behaves as an inductance, the reactance of which is varied in accordance with the audio frequency modulation.

The vacuum tube 121 has its anode 143 connected to tapping B, and it also has a cathode 144, a grid 145, a screen grid 146 and a suppressor grid 147 which is connected to cathode 144. The grid 145 is connected to anode 143 through a small condenser 148; grid 145 is also connected to cathode 144 through a high resistance 149 and a relatively large isolating condenser 150. Bias is provided for grid 145 through resistor 149 and a radio frequency choke 151 from rectifier 152 in a manner to be described later. The condenser 148 and resistor 149 are so proportioned that when a radio frequency A.C. voltage is applied between anode 143 and cathode 144, an A.C. voltage is applied between grid 145 and cathode 144 which leads the anode-cathode voltage by almost 90°, so that the anode current leads the anode voltage by nearly 90° and the anode-cathode circuit has the properties of a capacitance. The reactance of this capacitive circuit is varied by applying the audio frequency modulating signal, from the terminals 136, 153 of transformer 138 to the screen grid 146, in series with a D.C. screen voltage derived from terminals 139, 140 of the D.C. source 141; the cathode 144 is connected to the D.C. negative terminal 140 and to cathode 126. Accordingly, the vacuum tube 121 behaves as a capacitance, the reactance of which is varied in accordance with the audio frequency modulation; however, since the audio frequency signal is applied in antiphase to the tubes 120 and 121 from opposite end terminals 137, 153 of transformer 138 the reactance of one tube will increase while the other decreases, and vice versa. The voltage vectors of the A.C. anode-to-cathode voltages across tubes 120, 121, may therefore be represented respectively by the vectors A'P' and B'P' in Figure 6 and, when the reactances of these tubes are varied in opposite sense by the audio modulating signal, the point P' will move round the dotted arcuate locus. The point P' in Figure 6 corresponds to the common point of the two reactances, or to the common cathodes as denoted in Figure 8.

The point O' in Figure 6 is established in the circuit of Fig. 8 by means of the inductor 154 and resistor 155 which are serially connected through terminal O, across the R.F. input terminals X and Y. An output voltage O'P', which is variable in phase but may be substantially constant in amplitude, is taken from the points O and P in Figure 8, in series with the terminals 140, 156 of the D.C. source 141 and is applied to a coupling coil 157 which induces a phase modulated output voltage into coil 158.

The D.C. anode circuit of tubes 120, 121 can be traced from cathodes 126, 144 to point P and thence through terminals 140, 156 of D.C. source 141 and through coil 157 to terminal O, after which it branches through inductor 154 and resistor 155 to terminals X and Y on coil 123 and thence individually from taps A and B to the anodes of tubes 120, 121 respectively. The D.C. source 141 is shunted by an A.C. by-pass condenser 159.

Additional circuit arrangements will now be described for maintaining the position of point P' somewhere near its median position P'$_0$ under quiescent conditions when there is no modulation, in spite of possible drifts in tube currents and in R.F. input frequency. Negative grid bias for tube 120 is developed by rectifying a voltage proportional to voltage P'Y' in Figure 6, so that an increase in the voltage P'Y' due to a counterclockwise shift of point P' will increase the negative bias on tube 120, thus increasing its reactance and lengthening the vector A'P' so as to move P' clockwise to restore its position. Similarly, negative bias for tube 121 is developed by rectifying a voltage proportional to P'X' so that any increase in P'X' due to clockwise movement of P' will increase the reactance of tube 121, thus lengthening the vector B'P' so as to move P' counterclockwise to restore its position. The negative bias for tube 120 is derived by a connection 160 from point Y through a small condenser 161 to a terminal 162 which is connected through rectifier 135 in parallel with resistor 163 to terminal P which is connected to cathode 126. Rectifier 135 is so polarized as to develop a negative voltage at terminal 162, which is proportional to the A.C. component of voltage Y'P' and which is applied to grid 127 through R.F. choke 134 and resistor 133.

The negative bias for tube 121 is derived by a connection 164 from point X through condenser 165 to terminal 166 which is connected through rectifier 152 in parallel with resistor 167 to terminal P which is connected to cathode 144. Rectifier 152 is so polarized as to develop a negative voltage at terminal 166, which is proportional to the A.C. component of voltage X'P' and which is applied to grid 145 through R.F. choke 151 and resistor 149.

The time constant of each of the rectifier circuits is made longer than that corresponding to the lowest required modulating frequency, so that the rectifier circuits operate to maintain a median position of P' in spite of slow drifts, while not appreciably restricting the desired movements of P' within the required range of modulating frequencies.

Although I have described my invention with a certain degree of particularity in its preferred form, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A phase modulator including a saturable reactor and comprising: a first and a second impedance serially connected through a first output terminal across coupling means for an alternating current carrier source; a third and a fourth impedance coupled to said coupling means, said fourth impedance being a variable impedance winding of said saturable reactor; a second output terminal coupled to said fourth impedance; a first permeable core portion of said saturable reactor, interlinking said variable impedance winding; a second permeable core portion of said saturable reactor; a modulation winding interlinking said second core portion, and having connections for a modulation source; a saturating winding interlinking said second core portion; a first rectifier and a first rectifier impedance connected in series with at least a part of said saturating winding between a point on said coupling means and said second output terminal; and a second rectifier and a second rectifier impedance connected in series with at least a part of said saturating winding between another point on said coupling means and said second output terminal.

2. In a phase modulator which includes a phase shifting network, the combination of: an electrical input circuit which includes an oscillatory tank circuit adapted to be energized from an alternating current carrier source; a saturable reactor having a first and a second magnetic core portion and three electromagnetic windings: the first of said windings disposed on the first core portion and being adapted to be connected to a modulation source whereby said winding upon current flowing therethrough partially saturates the second core portion; the second winding disposed on the second core portion and said winding in series with an electrical impedance being coupled to said tank circuit to form a phase shifting network; a first output terminal coupled to the second winding and said impedance; a rectifier circuit which includes a rectifier and a reactive load; said rectifier circuit being connected with its input between said first output terminal and a point on the tank circuit; said third winding disposed on the first core portion and being connected across at least part of said reactive load; said rectifier supplying as its output rectified stabilizing current to said third winding, causing the phase modulator to produce a phase modulated output signal apparent between the first output terminal and a second output terminal which is coupled to the oscillatory tank circuit, and the mean phase angle of this output signal being stabilized.

3. A phase modulator as set forth in claim 2 wherein the rectifier circuit has a time constant at least as long as the longest periodic time of said modulation source.

4. The combination of an oscillator tank circuit and a phase modulator with a network for stabilizing the phase angle of the voltage between the output terminals of the phase modulator comprising: a phase reference point on said tank circuit; said phase modulator including two reactive elements serially energized from said tank circuit, at least one of said elements being variable; a set of control means connected to vary the reactance of said one element; a set of two output terminals, the first terminal thereof disposed between said two reactive elements and the second terminal connected to said tank circuit; said stabilizing network including a rectifier, a rectifier load and a rectifier reactance; the input to said network being connected between the first terminal and said phase reference point; the output of said network being connected to said control means to control said reactance, whereby upon application of a modulation source to said variable reactive element a phase modulated output voltage is produced across said two output terminals, the mean phase angle of said output voltage being substantially constant.

5. A combination of the type set forth in claim 4 wherein the stabilizing network has a time constant which is at least as long as the longest periodic time of said modulation source.

6. A phase modulating network comprising: an input coupling for energization by a carrier source of constant frequency; a pair of fixed impedances serially connected to one another across said input coupling; a first output terminal connected to the junction between said impedances; a second pair of impedances, at least one of which is variable, serially connected with each other and coupled to said input coupling; a second output terminal connected to said junction between said second pair of impedances; control terminals including at least two modulating terminals coupled to said variable impedance for varying its impedance value and so varying the phase angle of the voltage between said output terminals in relation to the phase angle of the carrier source; a rectifier and a time delay element connected in a stabilizing circuit and said circuit being energized with alternating current by connections to said second output terminal and to a point on said input coupling respectively, to develop from said alternating current a direct current signal which is connected across at least two of said control terminals, and said modulating terminals being adapted for connection to a modulating source.

References Cited in the file of this patent
UNITED STATES PATENTS

| | | |
|---|---|---|
| 2,426,996 | Goodall | Sept. 9, 1947 |
| 2,452,547 | Chatterjea et al. | Nov. 2, 1948 |
| 2,495,634 | Hepp | Jan. 24, 1950 |
| 2,552,157 | Delvaux | May 8, 1951 |
| 2,577,795 | Mohr | Dec. 11, 1951 |